(12) United States Patent
Lin et al.

(10) Patent No.: US 8,410,711 B2
(45) Date of Patent: Apr. 2, 2013

(54) CIRCUITS AND METHODS FOR DRIVING LIGHT SOURCES

(75) Inventors: Yung Lin Lin, Palo Alto, CA (US); Sterling Du, Palo Alto, CA (US)

(73) Assignee: O2Micro Inc, Santa Clara, CA (US)

( * ) Notice: Subject to any disclaimer, the term of this patent is extended or adjusted under 35 U.S.C. 154(b) by 0 days.

(21) Appl. No.: 13/218,755

(22) Filed: Aug. 26, 2011

(65) Prior Publication Data

US 2012/0217878 A1  Aug. 30, 2012

Related U.S. Application Data

(62) Division of application No. 12/968,035, filed on Dec. 14, 2010, now Pat. No. 8,040,071.

(51) Int. Cl.
*H05B 37/00* (2006.01)
(52) U.S. Cl. .......................... 315/224; 315/307; 315/308
(58) Field of Classification Search .................. 315/224, 315/291, 307, 308
See application file for complete search history.

(56) References Cited

U.S. PATENT DOCUMENTS

| | | | |
|---|---|---|---|
| 5,457,450 A * | 10/1995 | Deese et al. .................. | 340/912 |
| 6,856,103 B1 | 2/2005 | Hudson et al. | |
| 6,864,641 B2 | 3/2005 | Dygert | |
| 7,622,871 B2 | 11/2009 | Awalt et al. | |
| 7,733,034 B2 | 6/2010 | Kotikalapoodi et al. | |
| 7,741,788 B2 | 6/2010 | Ito et al. | |
| 7,791,326 B2 | 9/2010 | Dahlman et al. | |
| 7,855,520 B2 | 12/2010 | Leng | |
| 7,940,014 B2 | 5/2011 | Shin et al. | |
| 7,960,922 B2 | 6/2011 | Roberts et al. | |
| 7,977,891 B2 | 7/2011 | Shiu et al. | |
| 8,044,609 B2 | 10/2011 | Liu | |
| 2002/0175826 A1 * | 11/2002 | Hutchison et al. ....... | 340/815.45 |
| 2008/0144299 A1 | 6/2008 | Redmond | |

FOREIGN PATENT DOCUMENTS

| | | |
|---|---|---|
| CN | 101668373 A | 3/2010 |
| CN | 101702849 A | 5/2010 |
| CN | 101827478 A | 9/2010 |

OTHER PUBLICATIONS

Datasheet describing Acrich2 IC, Seoul Semiconductor Inc., Aug. 2011 (16 pages).

* cited by examiner

*Primary Examiner* — David Hung Vu

(57) ABSTRACT

In one embodiment, a driving circuit includes an AC/DC converter which converts an AC voltage to a DC voltage and a DC/DC linear regulator which regulates a current through, e.g., an LED light source, according to a first current reference if a monitoring signal indicating the DC voltage is within a predetermined range, and regulates the current according to a second current reference less than the first current reference if the monitoring signal is beyond the predetermined range. In another embodiment, a controller controlling power to an LED light source turns on a first plurality of LEDs and turns off a second plurality of LEDs if a monitoring signal indicative of a DC voltage received by the LED light source is within a predetermined range, and turns on both first and second plurality of LEDs if the monitoring signal is beyond the predetermined range.

3 Claims, 4 Drawing Sheets

CIRCUITS AND METHODS FOR DRIVING LIGHT SOURCES

RELATED APPLICATIONS

This application is a divisional of the U.S. application, Ser. No. 12/968,035, now U.S. Pat. No. 8,040,071, titled "Circuits and Methods for Driving Light Sources," filed on Dec. 14, 2010, which is hereby incorporated by reference in its entirety.

BACKGROUND

Light-emitting diodes (LEDs) can be used in many applications such as general lighting. LEDs offer several advantages over traditional light sources such as fluorescent lamps and incandescent lamps. For example, LEDs have significant lower power consumption. Unlike traditional light sources such as incandescent light bulbs that convert significant electrical current heating up the metal filaments to a temperature high enough to generate light, LEDs generate virtually no heat and utilize a fraction of the energy to produce an equivalent lumen of lighting. For example, in a light bulb application, an LED light source may consume less than 7 Watts to produce the same amount of brightness compared to an incandescent light source consuming approximately 60 Watts.

Furthermore, the operational life of an LED can be extended to over 50,000 hours which is significantly longer than the average life of an incandescent bulb, e.g., 5000 hours, and the average life of a fluorescent lamp, e.g., 15,000 hours. Moreover, LEDs contain no mercury or any other hazardous materials or chemicals and emit zero ultra violet (UV) radiation unlike incandescent or fluorescent lamps. The use of the LEDs materially enhances the environment and conserves energy.

Traditionally, an AC/DC converter converts an AC input voltage to a DC voltage to power the LEDs. FIG. 1 illustrates an example of a typical driving circuit 100 for driving a light source, e.g., an LED array 108. The driving circuit 100 includes a bridge rectifier 104 for rectifying the AC voltage to a rectified AC voltage, and an electrolytic capacitor $C_{BULK}$ coupled to the bridge rectifier 104 for filtering the rectified AC voltage to provide a substantially constant DC voltage $V_{IN}$.

The driving circuit 100 further includes a switching-mode DC/DC converter 122 that converts the DC voltage $V_{IN}$ to a DC voltage $V_{OUT}$ across a capacitor 116 to power the LED array 108. In operation, a controller 118 generates an ON/OFF signal to turn a switch 106 fully on and off alternately to control the power for the LED array 108. However, the turn-on and turn-off of the switch 106 generates electromagnetic interference (EMI) noise such that an EMI filter 130 is required to suppress the noise on the power line. Furthermore, the switching-mode DC/DC converter 122 usually includes bulky elements such as an inductor 112 (or a transformer) and a capacitor 116. The EMI filter and the inductor (or transformer) and capacitor are generally large in size, thereby making it difficult to place these elements into existing lighting fixtures.

SUMMARY

Embodiments in accordance with the present invention provide circuits and methods for driving light sources, e.g., a light-emitting diode (LED) light source. In one embodiment, a light source driving circuit includes an AC/DC converter and a DC/DC linear regulator. The AC/DC converter converts an AC voltage to a DC voltage. The DC/DC linear regulator regulates a current through the LED light source according to a first current reference if a signal indicative of the DC voltage is within a predetermined range, and regulates the current according to a second current reference less than the first current reference if the signal indicative of the DC voltage is beyond the predetermined range. In another embodiment, a controller controls power to an LED light source. The LED light source includes a first plurality of LEDs and a second plurality of LEDs. The controller turns on the first plurality of LEDs and turns off the second plurality of LEDs if a signal indicative of a DC voltage received by the LED light source is within a predetermined range, and turns on both the first plurality and the second plurality of LEDs if the signal indicative of the DC voltage is beyond the predetermined range.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide circuits and methods for driving one or more light sources such as a light-emitting diode (LED) light source. Advantageously, the circuits according to present invention can adapt to different AC input voltage in different countries and regions. Moreover, unlike the conventional AC/DC converter cooperating with the switching-mode DC/DC converter, the DC/DC linear regulator in accordance with embodiments of the present invention does not generate electromagnetic interference (EMI) noise, and thus does not require EMI filters. In addition, the bulky circuitry components such as inductors in the conventional switching mode DC/DC converter can be omitted.

Figure 1:
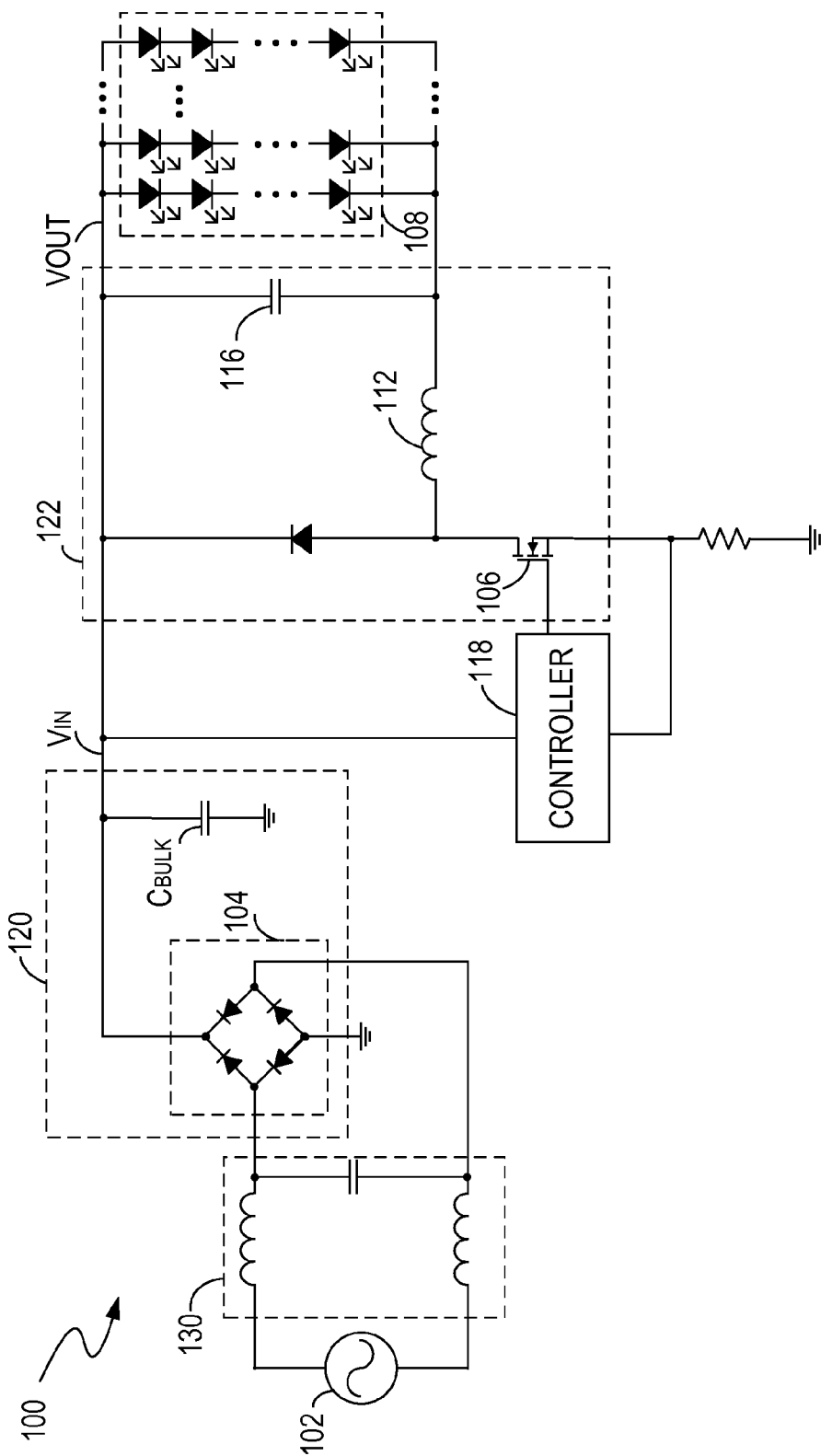
FIG. 1 illustrates an example of a conventional driving circuit for driving a light source.
Figure 2:
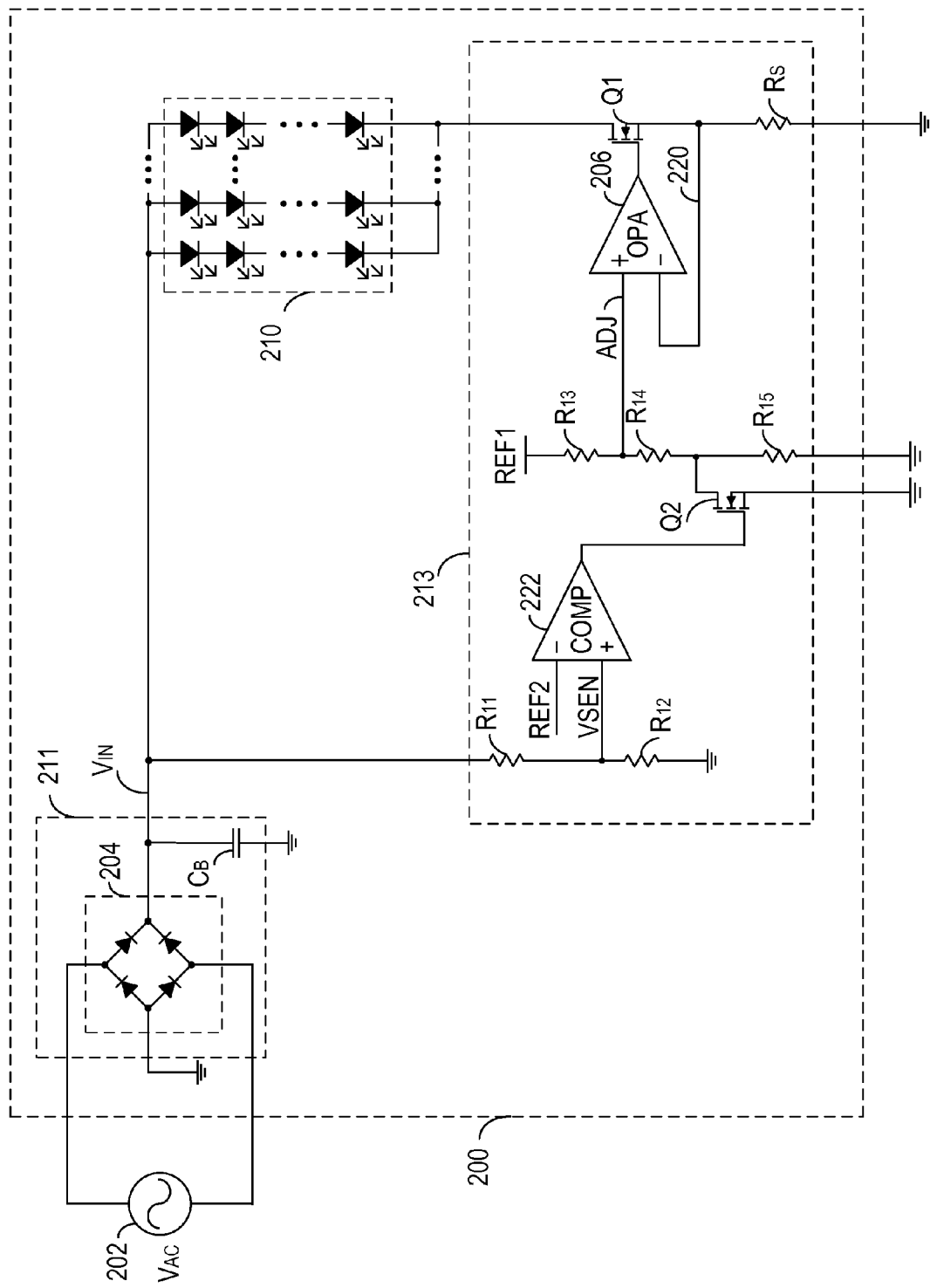
FIG. 2 shows a driving circuit, in accordance with one embodiment of the present invention.

FIG. 2 shows a driving circuit 200, in accordance with one embodiment of the present invention. In the example of FIG. 2, the driving circuit 200 includes an AC/DC converter 211 for receiving an AC input voltage and outputting a DC voltage $V_{IN}$, and a DC/DC linear regulator 213 for receiving the DC voltage $V_{IN}$ and controlling a current flowing through the light source. For illustrative purposes, the light source in FIG. 2 includes an LED array 210 having a plurality of LED strings. The light source can be other types of light sources. In the example of FIG. 2, the AC/DC converter 211 includes a rectifier (e.g., a bridge rectifier 204 including four diodes) and a capacitor $C_B$ for converting an AC voltage $V_{AC}$ from an AC power source 202 to the DC voltage $V_{IN}$. The DC voltage $V_{IN}$ is substantially constant. The DC/DC linear regulator 213 is operable for regulating a current through the LED array 210 according to a first current reference if a signal VSEN indicative of the DC voltage $V_{IN}$ is within a predetermined range, and for regulating the current according to a second current reference less than the first current reference if the signal VSEN indicative of the DC voltage $V_{IN}$ is beyond the predetermined range. In the example of FIG. 2, the DC/DC linear regulator 213 includes a comparator 222 coupled to the AC/DC converter 211 for comparing the signal VSEN to a predetermined reference signal REF2, and an amplifier 206 for linearly controlling a switch Q1 in series with the LED array 210 based on the first current reference or the second current reference.

More specifically, in the example of FIG. 2, the comparator 222 is coupled to the AC/DC converter 211 through a first voltage divider including series-connected resistors R11 and R12. A non-inverting input of the comparator 222 receives the signal VSEN from the first voltage divider. The signal VSEN indicates the DC voltage $V_{IN}$. An inverting input of the comparator 222 receives the predetermined reference signal REF2. The comparator 222 compares the signal VSEN to the predetermined reference signal REF2 and generates an output to control a switch Q2. The switch Q2 is coupled to a second voltage divider coupled between a reference voltage REF1 and ground, which includes series-connected resistors R13, R14 and R15. In the example of FIG. 2, the switch Q2 is coupled between the resistor R15 and ground. The amplifier 206 has a non-inverting input coupled to a common node between the resistor R13 and the resistor R14 for receiving a current reference ADJ, and has an inverting input coupled to a current sensor, e.g., a sensing resistor Rs in series with the LED array 210, for receiving a sensing signal 220 indicative of the current flowing through the LED array 210. The amplifier 206 compares the sensing signal 220 to the current reference ADJ and generates an error signal to control the switch Q1 linearly.

In operation, if the driving circuit 200 receives a first AC input voltage $V_{AC1}$ (e.g., 110V AC), the AC/DC converter 211 provides a DC voltage $V_{IN}$ substantially equal to the peak voltage $V_{P1}$ of the AC input voltage $V_{AC1}$, in one embodiment. The signal VSEN provided by the first voltage divider has a voltage level of $V_{P1}*R12/(R11+R12)$ which is less than the voltage level of the reference signal REF2. As such, the output of the comparator 222 is in a first state, e.g., logic low, to turn off the switch Q2. If the switch Q2 is turned off, the current reference ADJ has a first level, e.g., REF1*(R14+R15)/(R13+R14+R15). The amplifier 206 controls the switch Q1 linearly to regulate the current of the LED array 210 until the voltage level of the sensing signal 220 is substantially equal to the voltage level of the current reference ADJ.

If, however, the driving circuit 200 receives a second AC input voltage $V_{AC2}$ (e.g., 220V AC), the AC/DC converter 211 provides a DC voltage $V_{IN}$ substantially equal to the peak voltage $V_{P2}$ of the AC input voltage $V_{AC2}$, in one embodiment. The signal VSEN provided by the first voltage divider has a voltage level of $V_{P2}*R12/(R11+R12)$ which is greater than the voltage level of the reference signal REF2. As such, the output of the comparator 222 is in a second state, e.g., logic high, to turn on the switch Q2. If the switch Q2 is turned on, the current reference ADJ has a second level, e.g., REF1*R14/(R13+R14). The amplifier 206 controls the switch Q1 linearly to regulate the current of the LED array 210 until the voltage level of the sensing signal 220 is substantially equal to the voltage level of the current reference ADJ.

Accordingly, if the input AC voltage is $V_{AC1}$, the signal VSEN indicative of the input AC voltage is within a predetermined range (e.g., the voltage level of the signal VSEN is less than the voltage level of the reference signal REF2), the DC/DC linear regulator 213 regulates the current through the LED array 210 according to a first current reference, e.g., the current reference ADJ has a voltage level of REF1*(R14+R15)/(R13+R14+R15). If the input AC voltage is $V_{AC2}$, the signal VSEN indicative of the input AC voltage is beyond the predetermined range (e.g., the voltage level of the signal VSEN is greater than the voltage level of the reference signal REF2), the DC/DC linear regulator 213 then regulates the current through the LED array 210 according to a second current reference, e.g., the current reference ADJ has a voltage level of REF1*R14/(R13+R14). In one embodiment, the reference signal REF2 has a voltage level greater than $V_{P1}*R12/(R11+R12)$ but less than $V_{P2}*R12/(R11+R12)$. Advantageously, if the driving circuit 200 receives the input AC voltage $V_{AC2}$, the current reference automatically decreases to REF1*R14/(R13+R14). Consequently, the power to the LED array 210 is decreased, thereby preventing the driving circuit 200 from being damaged due to the relatively high input AC voltage.

Figure 3:
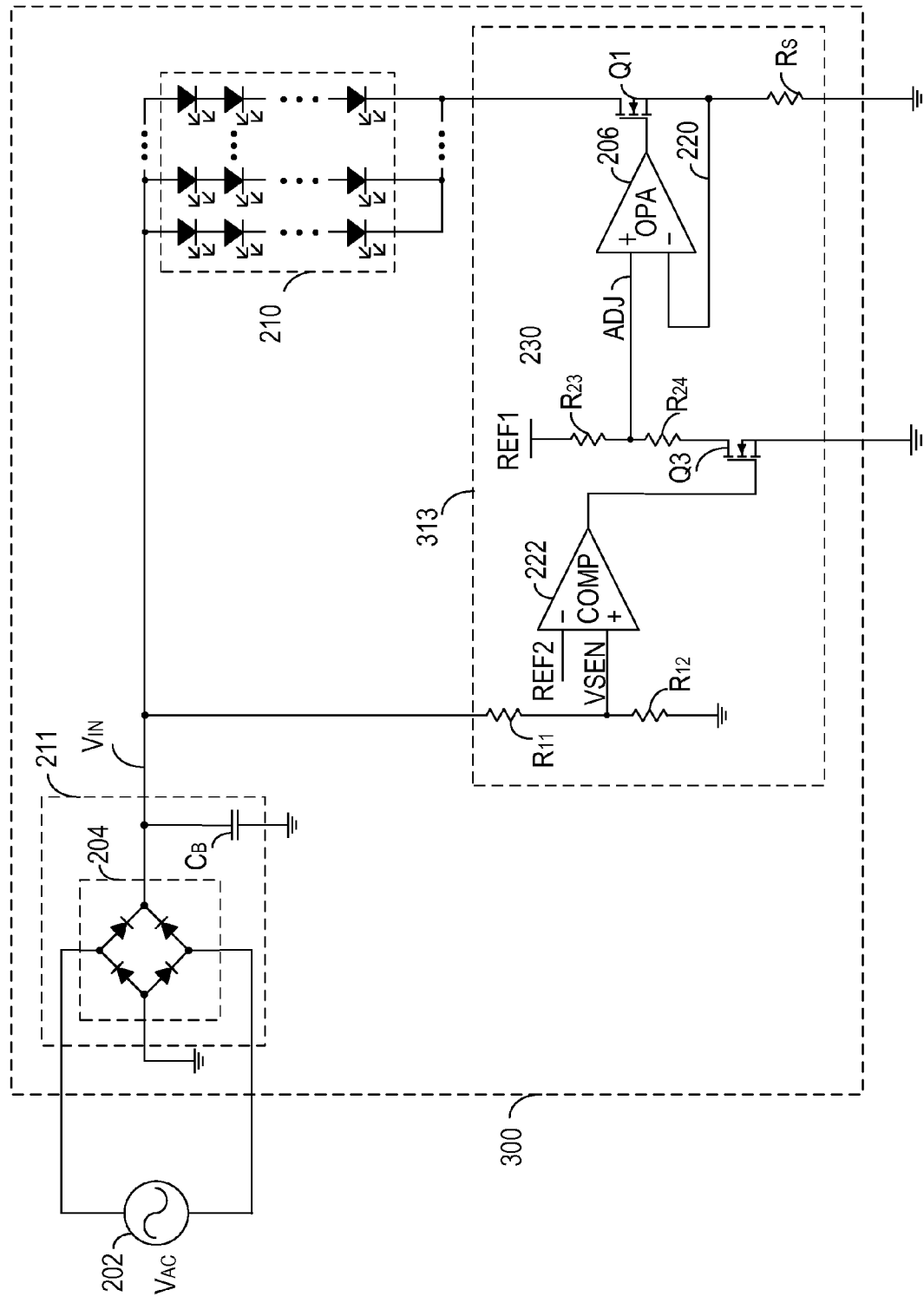
FIG. 3 shows a driving circuit, in accordance with another embodiment of the present invention.

FIG. 3 shows a driving circuit 300, in accordance with one embodiment of the present invention. Elements labeled the same as in FIG. 2 have similar functions. Similar to the driving circuit 200, the driving circuit 300 includes a comparator 222 for comparing a signal VSEN to a predetermined reference signal REF2 and an amplifier 206 for linearly controlling a switch Q1 in series with an LED array 210. In the example of FIG. 3, the signal VSEN indicative of a DC voltage $V_{IN}$ generated by an AC/DC converter 211 is provided by a first voltage divider including series-connected resistors R11 and R12. The output of the comparator 222 is coupled to a switch Q3 in series with a second voltage divider. In the example of FIG. 3, the second voltage divider coupled between a reference REF1 and ground includes series-connected resistors R23 and R24. The amplifier 206 controls the switch Q1 linearly by comparing a sensing signal 220 indicative of the current through the LED array 210 to a current reference ADJ. The current reference ADJ is obtained from a common node of the resistors R23 and R24. The sensing signal 220 is obtained from a current sensor, e.g., a sensing resistor Rs, in series with the LED array 210.

In operation, if the driving circuit 300 receives the second AC input voltage $V_{AC2}$ (e.g., 220V AC), the AC/DC converter 211 provides a DC voltage $V_{IN}$ substantially equal to the peak voltage $V_{P2}$ of the AC input voltage $V_{AC2}$, in one embodiment. The signal VSEN provided by the first voltage divider has a voltage level of $V_{P2}*R12/(R11+R12)$ which is greater than the voltage level of the reference signal REF2. As such, the output of the comparator 222 is in the second state, e.g., logic high, to turn on the switch Q3. If the switch Q3 is turned on, the voltage level of the current reference ADJ is equal to REF1*R24/(R23+R24). The amplifier 206 controls the switch Q1 linearly to regulate the current of the LED array 210 until the voltage level of the sensing signal 220 is substantially equal to the voltage level of the current reference ADJ.

If, however, the driving circuit 300 receives the first AC input voltage $V_{AC1}$ (e.g., 110V AC), the AC/DC converter 211 provides a DC voltage $V_{IN}$ substantially equal to the peak voltage $V_{P1}$ of the AC input voltage $V_{AC1}$, in one embodiment. The signal VSEN provided by the first voltage divider has a voltage level of $V_{P1}*R12/(R11+R12)$ which is less than the voltage level of the reference signal REF2. As such, the output of the comparator 222 is in the first state, e.g., logic low, to turn off the switch Q3. If the switch Q3 is turned off, the voltage level of the current reference ADJ is pulled to REF1. In one embodiment, the amplifier 206 outputs logic high to fully turn on the switch Q1.

Accordingly, if the input AC voltage is $V_{AC2}$, the signal VSEN indicative of the input AC voltage is beyond a predetermined range (e.g., the voltage level of the signal VSEN is greater than the voltage level of the reference signal REF2), the DC/DC linear regulator 313 control the switch Q1 linearly to regulate the current through the LED array 210 according to a first current reference, e.g., the current reference ADJ has a voltage level of REF1*R24/(R23+R24). If the input AC voltage is $V_{AC1}$, the signal VSEN indicative of the input AC voltage is within the predetermined range (e.g., the voltage level of the signal VSEN is less than the voltage level of the reference signal REF2), the DC/DC linear regulator 313 then fully turns on the switch Q1 to maximize the voltage across the LED array 210, in one embodiment.

Figure 4:
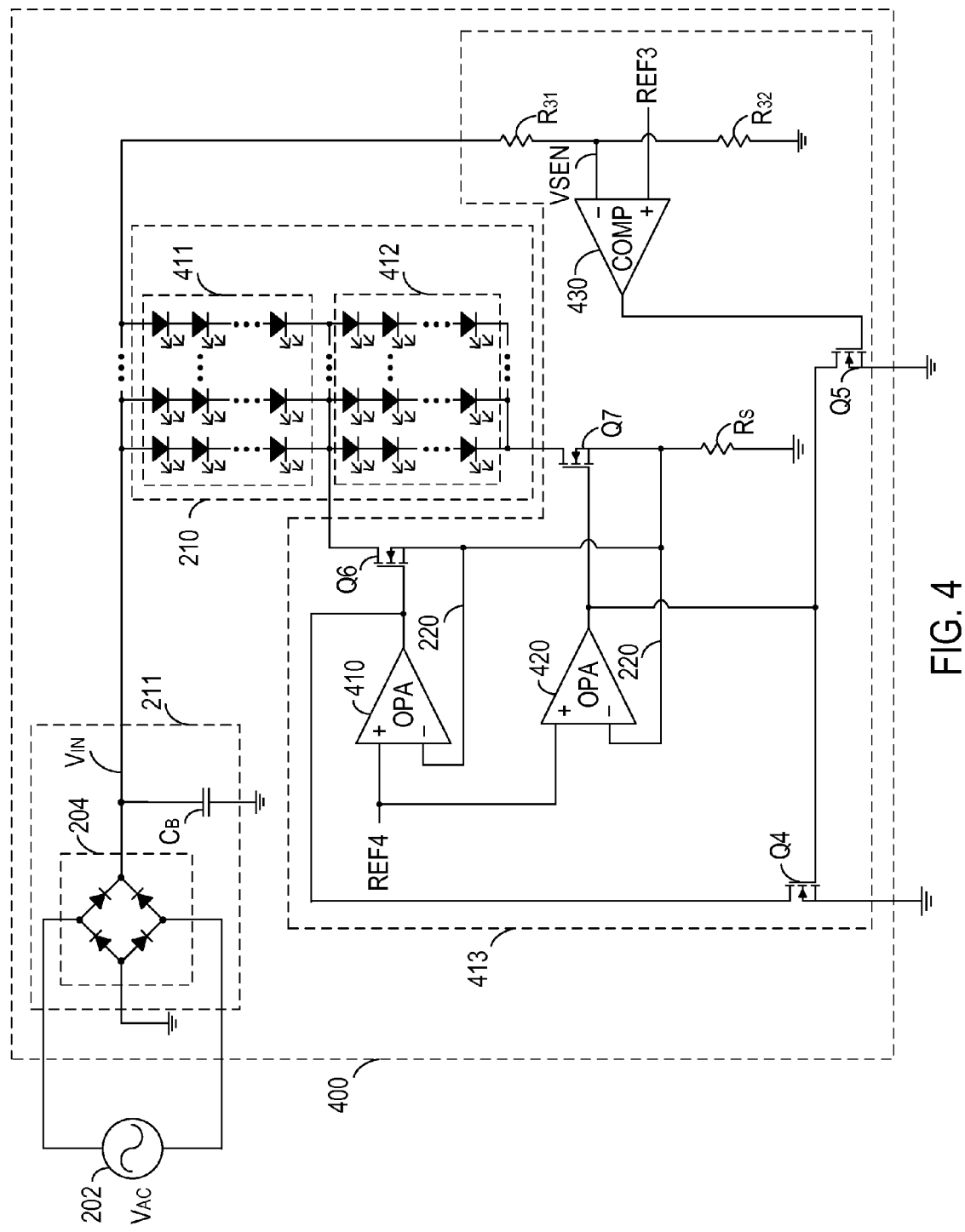
FIG. 4 shows a driving circuit, in accordance with another embodiment of the present invention.

FIG. 4 shows a driving circuit 400, in accordance with one embodiment of the present invention. Elements labeled the same as in FIG. 2 and FIG. 3 have similar functions. In the example of FIG. 4, the driving circuit 400 includes an AC/DC converter 211 for receiving an AC input voltage and outputting a DC voltage $V_{IN}$, and a DC/DC linear regulator 413 for receiving the DC voltage $V_{IN}$ and controlling a current flowing through an LED light source 210. In the example of FIG. 4, the LED light source 210 includes a first plurality of LEDs 411 and a second plurality of LEDs 412. The first plurality of LEDs 411 includes multiple LED strings coupled to the AC/DC converter 211. The second plurality of LEDs 412 includes multiple LED strings coupled in series with the LED strings of the first plurality of LEDs 411. The AC/DC converter 211 includes a rectifier (e.g., a bridge rectifier 204 including four diodes) and a capacitor $C_B$ for converting an AC voltage $V_{AC}$ from an AC power source 202 to a DC voltage $V_{IN}$ which is substantially constant. The DC/DC linear regulator 413 is operable for turning on the first plurality of LEDs 411 and turning off the second plurality of LEDs 412 of the LED light source 210 if a signal VSEN indicative of said DC voltage $V_{IN}$ is within a predetermined range, (e.g., less than the predetermined reference signal REF3); and for turning on the first plurality of LEDs 411 and the second plurality of LEDs 412 of the LED light source 210 if the signal VSEN indicative of the DC voltage $V_{IN}$ is beyond the predetermined range (e.g., greater than a predetermined reference signal REF3), in one embodiment.

In the example of FIG. 4, the DC/DC linear regulator 413 includes a comparator 430 coupled to the AC/DC converter 211 for comparing the signal VSEN to the predetermined reference signal REF3. The inverting input of the comparator 430 is coupled to the AC/DC converter 211 through a voltage divider which includes series-connected resistors R31 and R32 for receiving the signal VSEN from a common node between the resistor R31 and R32. The non-inverting input of the comparator 430 receives the reference signal REF3. The DC/DC linear regulator 413 further includes a first amplifier 410 for controlling a first switch Q6 and a second amplifier 420 for controlling a second switch Q7. The switch Q6 is coupled between the first plurality of LEDs 411 of the LED array 210 and ground. The switch Q7 is coupled between the second plurality of LEDs 412 of the LED array 210 and ground. In one embodiment, the switches Q6 and Q7 are complimentary, e.g., when the switch Q6 is on, the switch Q7 is off, and vice versa. Moreover, in the example of FIG. 4, the DC/DC linear regulator 413 includes a pair of complimentary switches Q4 and Q5, e.g., when the switch Q4 is on, the switch Q5 is off, and vice versa. The switch Q4 is coupled between the switch Q6 and ground. The switch Q5 is coupled to the switch Q4 and Q7, and is also coupled to an output of the comparator 430.

In operation, if the signal VSEN indicative of the input AC voltage is beyond the predetermined range (e.g., if the signal VSEN is greater than the predetermined reference signal REF3), the output of the comparator 430 is in a first state, e.g., logic low, to turn off the switch Q5. As such, the switch Q4 is on, and thus the output of the amplifier 410 is coupled to ground to turn off the switch Q6. Consequently, the amplifier 420 controls the switch Q7 linearly by comparing the sensing signal 220 indicative of the current through the first plurality of LEDs 411 and the second plurality of LEDs 412 of the LED array 210 to a current reference REF4 to regulate current through the first plurality of LEDs 411 and the second plurality of LEDs 412 of the LED array 210. If, however, the signal VSEN indicative of the input AC voltage is within the predetermined range (e.g., the signal VSEN is less than the predetermined reference signal REF3), the output of the comparator 430 is in a second state, e.g., logic high, to turn on the switch Q5. As such, the switch Q4 is off, and thus the output of the amplifier 420 is coupled to ground to turn off the switch Q7. Consequently, the second plurality of LEDs 412 of the LED array 210 is off, and the amplifier 410 controls the switch Q6 linearly by comparing a sensing signal 220 indicative of the current through the first plurality of LEDs 411 of the LED array 210 to the current reference REF4 to regulate the current through the first plurality of LEDs 411 of the LED array 210.

Accordingly, if the input AC voltage $V_{AC}$ is relatively high such that the signal VSEN is greater than the predetermined reference signal REF3, both the first plurality of LEDs 411 and the second plurality of LEDs 412 of the LED array 210 are turned on and the current through the LED array 210 are regulated according a current reference, e.g., REF4. If the input AC voltage $V_{AC}$ is relatively low such that the signal VSEN is less than the predetermined reference signal REF3, only portion of the LED array 210 is powered, e.g., the first plurality of LEDs 411 of the LED array 210 is powered on while the second plurality of LEDs 412 of the LED array 210 is off. Thus, the current through the first plurality of LEDs 411 is regulated according the current reference REF4. In other words, the number of the LEDs powered on (e.g., to the rating) depends on the level of the AC voltage $V_{AC}$ received by the AC/DC converter 211.

In the examples of FIG. 2, FIG. 3 and FIG. 4, the LED array 210 is coupled to the AC/DC converter 211, and the DC/DC linear regulators 213, 313 and 413 are coupled between the LED array 210 and ground. However, in other embodiments, the DC/DC linear regulators 213, 313 and 413 can be coupled to the AC/DC converter 211, and the LED array 210 is coupled between the DC/DC linear regulators 213, 313 and 413 and ground.

Accordingly, embodiments in accordance with the present invention provide circuits and methods for driving one or more light sources such as a light-emitting diode (LED) light source. Advantageously, unlike some conventional light source driving circuits which require switching-mode DC/DC converters including bulky inductors, capacitors and switching devices, the driving circuits according to present invention employ a DC/DC linear regulator to regulate the current of the light source. Moreover, the DC/DC linear regulator in accordance with embodiments of the present invention does not generate electromagnetic interference (EMI) noise, and thus does not require EMI filters. Furthermore, the driving circuits according to present invention can adapt to different AC input voltages in different countries and regions.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

The invention claimed is:

1. A controller for controlling power to a light-emitting diode (LED) light source which receives a DC voltage, wherein said LED light source comprises a first plurality of LEDs and a second plurality of LEDs, and wherein said controller is operable for turning on said first plurality of LEDs and turning off said second plurality of LEDs if a signal indicative of said DC voltage is within a predetermined range, and for turning on both said first plurality and said second plurality of LEDs if said signal indicative of said DC voltage is beyond said predetermined range, said controller comprising:
   a first switch coupled to said first plurality of LEDs;
   a second switch coupled to said second plurality of LEDs;
   wherein said first switch is controlled linearly and said second switch is turned off if said signal indicative of said DC voltage is within said predetermined range,
   wherein said first switch is turned off and said second switch is controlled linearly if said signal indicative of said DC voltage is beyond said predetermined range, and
   a comparator for comparing said signal indicative of said DC voltage to a predetermined reference signal, wherein said first switch and said second switch are controlled according to an output of said comparator.

2. A controller for controlling power to a light-emitting diode (LED) light source which receives a DC voltage, wherein said LED light source comprises a first plurality of LEDs and a second plurality of LEDs, and wherein said controller is operable for turning on said first plurality of LEDs and turning off said second plurality of LEDs if a signal indicative of said DC voltage is within a predetermined range, and for turning on both said first plurality and said second plurality of LEDs if said signal indicative of said DC voltage is beyond said predetermined range, said controller comprising:
   a first switch coupled to said first plurality of LEDs;
   a second switch coupled to said second plurality of LEDs;
   wherein said first switch is controlled linearly and said second switch is turned off if said signal indicative of said DC voltage is within said predetermined range,
   wherein said first switch is turned off and said second switch is controlled linearly if said signal indicative of said DC voltage is beyond said predetermined range, and
   an amplifier for comparing a current through said first plurality of LEDs to a current reference and to control said first switch linearly.

3. A controller for controlling power to a light-emitting diode (LED) light source which receives a DC voltage, wherein said LED light source comprises a first plurality of LEDs and a second plurality of LEDs, and wherein said controller is operable for turning on said first plurality of LEDs and turning off said second plurality of LEDs if a signal indicative of said DC voltage is within a predetermined range, and for turning on both said first plurality and said second plurality of LEDs if said signal indicative of said DC voltage is beyond said predetermined range, said controller comprising:
   a first switch coupled to said first plurality of LEDs;
   a second switch coupled to said second plurality of LEDs;
   wherein said first switch is controlled linearly and said second switch is turned off if said signal indicative of said DC voltage is within said predetermined range,
   wherein said first switch is turned off and said second switch is controlled linearly if said signal indicative of said DC voltage is beyond said predetermined range, and
   an amplifier for comparing a current through said first plurality of LEDs and said second plurality of LEDs to a current reference and to control said second switch linearly.

* * * * *